United States Patent Office 3,515,698
Patented June 2, 1970

3,515,698
HIGH MOLECULAR WEIGHT POLYMERS CONTAINING THE REACTION PRODUCT OF AN ALIPHATIC AMINE AND A MONO- OR DIOXIRANE AS ANTISTATIC AGENT
Otto Mauz, Niederhofheim, Taunus, Eugen Reindl, Burgkirchen an der Alz, and Hans Joachim Vetter, Frankfurt am Main-Schwanheim, Germany, assignors to Hercules Incorporated, Wilmington, Del., a corporation of Delaware
No Drawing. Filed May 24, 1967, Ser. No. 640,812
Int. Cl. C08f 3/02, 7/02; C08g 17/00
U.S. Cl. 260—75                                6 Claims

ABSTRACT OF THE DISCLOSURE

The tendency for high molecular weight polymers such as polyolefins and polyesters, and particularly shaped articles of such polymers, to accumulate electrostatic charges is reduced by incorporating into the polymer, prior to article formation, from about 0.05 to about 4% by weight of the polymer of the reaction product of a primary or secondary aliphatic amine with certain mono- or dioxiranes which are, for example, phenyl ethylene oxides, phenyl glycidyl ethers, alkyl glycidyl ethers, mono- or polyethylene glycol diglycidyl ethers and diepoxy alkanes.

High molecular weight polymers of organic compounds are, in general, good insulator materials which tend to accumulate electrostatic charges. For many applications, however, this tendency of the polymers to become electrostatically charged is a disadvantage due to the fact that molded articles such as film, fiber, and fabrics prepared from these polymers strongly attract dirt and dust particles and thus become rapidly soiled.

Various techniques have been employed to reduce the tendency of such polymers to accumulate an electrostatic charge. In one of such techniques, the surfaces of molded articles of the polymer are treated with an antistatic agent which is known to reduce the surface tension of polymers. However, the ease with which such agents can be wiped from the surface limits the life and hence the usefulness of such a treatment. In another technique, the antistatic agent is incorporated directly into the polymer. This technique offers the advantage of providing a more stable and economic antistatic finish. Typical antistatic agents which have been so employed include both ionic and nonionic substances. Ionic materials, i.e., salts, however, have proved to be highly impractical because of their corrosiveness to the processing equipment. On the other hand, the known nonionic additives, such as phosphoric acid derivatives, aliphatic amines, fatty acid amides, oxyalkylated amines or amides, polyalkylene glycols, amino alcohols and their esters, as well as reaction products of fatty acids or higher alcohols with low molecular weight alkylene oxides, although they improve to some degree the static resistance of polymers in which they are incorporated, do not meet all of the requirements of an effective antistatic agent. For example, the antistatic properties of polyolefins are ordinarily improved by the addition of the polymer of an N-hydroxyalkyl alkanolamine, as described in the process of Belgian Pat. 654,049. However, because these compounds migrate readily to the surfaces of the polymer, articles thereof are unsuitable for many purposes, as, for example, printed film. Additionally, the antistatic effect is not permanent and soon disappears, as, for example, when fibers or films of the polymer are stretched. Furthermore, during processing, as, for example, during injection molding of polyolefins containing the alkanolamine, a more or less strong discoloration is noticeable, the degree of discoloration depending upon processing temperature. Thus, despite improved antistatic effect, attendant disadvantages severely limit the field of application.

Ideally, a commercial antistatic agent should possess, in addition to the ability to reduce the accumulation of electrostatic charges, color stability at processing temperatures up to 300° C., very little inherent odor, resistance to extraction with water, resistance to exudation from the polymer, and a limited ability to diffuse or migrate throughout the polymer so that the agent reaches all the surfaces of finished parts but at the same time is resistant to removal from the surfaces by rubbing or wiping. Furthermore, it is desirable that the antistatic agent be effective immediately after processing of the poylmer without dependency on additional treatments, as, for example, flame treatment or high frequency discharge.

It has now been found that the static resistance of high molecular weight polymers and articles thereof can be considerably improved without at the same time realization of the disadvantages of the prior art additives by incorporating into the polymer, prior to article formation, certain reaction products of aliphatic secondary or primary amines and mono- or dioxiranes. Accordingly, the present invention relates to high molecular weight polymers containing as an antistatic agent from about 0.05 to about 4%, and preferably from about 0.3 to about 1.5%, by weight of the polymer of the reaction product of a primary or secondary aliphatic amine having the formula $R_1R_2NH$, where $R_1$ is an aliphatic hydrocarbon radical containing from 4 to 22 carbon atoms, and preferably from 12 to 18 carbon atoms, and $R_2$ is hydrogen or an aliphatic radical containing from 1 to 12 carbon atoms, and preferably from 1 to 4 carbon atoms, with an oxirane of the formula

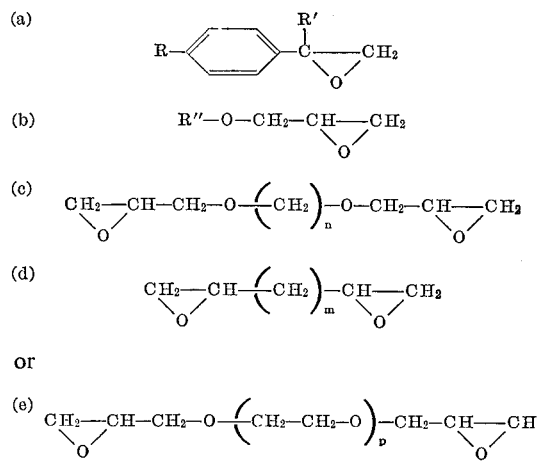

where R is hydrogen or an alkyl group containing from 1 to 12 carbon atoms, R' is hydrogen or methyl, R" is an alkyl group containing from 1 to 18 carbon atoms or

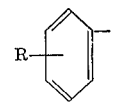

where R is as stated above, $m$ is 0 to 4, $n$ is 2 to 6, and $p$ is 2 to 4.

The reaction products of the present invention are not simple chemical compounds and hence are not capable of structural definition. They can be prepared very simply by heating the two components together at temperatures between about 120 and about 240° C., and preferably at about 140 to about 180° C., under normal pressure for 1 to 4 hours, the higher temperatures being preferred with secondary amines. The amount of reactants used will depend, of course, on whether the amine is a primary or secondary amine and on the particular oxirane. With primary amines and mono-oxiranes, the molar ratio of oxirane to amine preferably ranges from 2:1 to 1:1, whereas with secondary amines the molar ratio is preferably 1:1 and with dioxiranes, the molar ratio is preferably 1:2.

The amines which are reacted with the oxiranes of this invention are, as stated, primary or secondary aliphatic amines. Exemplary of such amines are butylamine, octylamine, decylamine, laurylamine, stearylamine, eicosylamine, dibutylamine, N-methyloctylamine, N-methyldodecylamine, N - ethyldodecylamine, N - methylstearylamine, N-ethylstearylamine, and mixtures thereof, as well as amines from the fatty acids of tallow, coconut oil, and the like.

Exemplary of the oxiranes which are reacted with the above amines are the aromatic ethylene oxides of Formula a, such as phenylethylene oxide (styrene oxide), p-methylphenylene oxide, alpha-methyl-alpha-phenyl-ethylene oxide (alpha-methylstyrene oxide), p-dodecylphenylethylene oxide, and the like; substituted glycidyl ethers of Formula b, such as phenylglycidyl ether, p-nonylphenylglycidyl ether, N-butylglycidyl ether, stearylglycidyl ether, and the like; the diglycidyl ethers of Formula c, such as ethyleneglycol diglycidyl ether, 1,4-butanediol diglycidyl ether, and 1,6-hexanediol diglycidyl ether; the diepoxyalkanes of Formula d, such as 1,2,3,4-diepoxybutane, 1,2,5,6-diepoxyhexane, and 1,2,7,8-diepoxyoctane; and the diglycidyl ethers of the polyethylene glycols of Formula e, such as diethyleneglycol diglycidyl ether, triethyleneglycol diglycidyl ether, and the like.

The amine oxirane reaction products of this invention, in addition to reducing the tendency of polymers containing them to become electrostatically charged, improve the blocking resistance of the polymers during processing, withstand high processing temperatures without discoloration or exudation, are nonreactive wtih conventional additives such as stabilizers or pigments, exhibit no corroding effect on processing equipment, and are compatible with high molecular weight polymeric materials.

The materials which are rendered static resistant in accordance with this invention are any of the high molecular weight polymers which tend to accumulate electrostatic charge. Particularly preferred are the high molecular weight polyolefins and polyesters such as, for example, homopolymers of ethylene, propylene, butene-1, 4-methylpentene-1, and styrene; copolymers of ethylene and propylene, ethylene and butene-1, and ethylene, propylene and butene-1; copolymers of 4-methylpentene-1 and 1-olefins; copolymers of styrene and acrylonitrile, methacrylonitrile, and diolefins such as butadiene-1,3; polyesters from terephthalic acid and glycols containing from 2 to 10 carbon atoms; and the like. Also suitable are lacquer raw materials such as polyvinylacetate, alkyd resins, and unsaturated polyester resins.

The reaction products of the invention can be added to the polymer during the polymerization itself, during granulation, or at a later time using conventional techniques, as, for example, dry mixing the polymer with the additive in a rolling mill or in a commercial mixer. The reaction product can also be added to the polymer as a solution or dispersion in a suitable liquid as, for example, in a solvent which has a swelling action for the polymeric material, such as a chlorinated hydrocarbon, in a non-swelling solvent, such as a low molecular weight aliphatic alcohol or ketone, or as a suspension or a dispersion in a liquid which is a partial solvent or nonsolvent for the additive. When liquids are employed, the liquid phase is removed after the treatment, as, for example, by evaporation.

The high molecular weight polymers can also contain, in addition to the additive of the invention, other additives such as stabilizers, fillers, colorants, lubricants, plasticizers, or pigments, provided they do not detract from the effectiveness of the reaction products of the invention as antistatic agents nor adversely affect the other desired properties of the polymer, as, for example, the mechanical and thermal properties, heat and aging resistance, and the like. If desired, one or more of the additives of the invention can be used alone or the additive can be used in combination with conventional antistatic agents.

The high molecular weight polymers containing the additives of the present invention are particularly useful for the formation of shaped articles such as film, fiber, moldings, and the like. The polymer can be formed into articles by any of the conventional shaping techniques known to the art, as, for example, by compression molding, injection molding, extrusion, casting, deep-drawing, and the like.

The invention is further illustrated by the following examples in which the amine-oxirane reaction product employed as additive in accordance with the invention was prepared by heating equal amounts of the amine and oxirane under the conditions set forth above unless otherwise stated. In each of these examples, 1% of the additive, based on the weight of the polymer, was thoroughly mixed with finely divided polymer in a conventional mixer. In those cases where the additive was liquid or highly viscous, it was added to the polymer as a 50% by weight solution in a suitable solvent, and after the mixing was completed, the solvent was removed by heating at 50 to 100° C. under 100 mm. Hg.

The polymeric mixtures prepared using polystyrene or polyethylene terephthalate as the polymer were compression molded into 7 cm. by 7 cm. by 1 mm. test plates by pressing the mixture between chrome-plated brass plates at 100 kg. per sq. cm. pressure at 150° C. or 270° C., respectively. The polymeric mixtures prepared using polyethylene or polypropylene were molded into 7 cm. by 7 cm. by 1 mm. test plates by extruding the mixture into strands, chopping the strands into small granules, and then injection molding the granules into the test plates at 220 to 290° C.

The antistatic activities of the test plates prepared for each example were than evaluated in the following manner, all measurements being at 20° C., 50% relative humidity, and atmospheric pressure:

FRICTION-ELECTRIC VOLTAGE TEST

Static charges were produced on each plate by moving a rotating (230 r.p.m.) cylinder covered with a woolen cloth back and forth horizontally over the plate. The maximum electrostatic charge in volts produced thereon by repeated treatments was measured by a probe placed 5 cm. from the test plate and is recorded in the table below as $V_1$. Thereafter, the test plate was wiped with a wet cloth, dried for 5 hours at room temperature, and the electrostatic charge remeasured as above, this value being recorded in the table as $V_2$.

CARBON BLACK TEST

The test plate was moved back and forth 10 times on a standard woolen cloth over a distance of 30 cm. under weak pressure and then maintained at a distance of 0.5 cm. above a layer of carbon black. The attraction of carbon black to the test plate was observed visually and recorded as (+) in the table when the carbon black was attracted to the plate and (−) when there was no attraction of carbon black.

TABLE

| Example No. | Polymer[1] | Additive | Surface charge (volts) $V_1$ | Surface charge (volts) $V_2$ | Carbon black test |
|---|---|---|---|---|---|
| Control A | PE | None | >3,700 | >3,700 | + |
| Control B | PE | Reaction product of stearylamine and ethylene oxide ((1:3). | −1,000 | −1,500 | + |
| 1 | PE | Reaction product of phenylethylene oxide and stearylamine. | −111 | +52 | − |
| 2 | PE | Reaction product of phenylethylene oxide+stearylamine (mol ratio 2:1). | −259 | +74 | − |
| 3 | PE | Reaction product of phenylethylene oxide+N-methylstearylamine. | −380 | −210 | − |
| 4 | PE | Reaction product of phenylglycidyl ether+stearylamine. | −150 | +200 | − |
| 5 | PE | Reaction product of phenylglycidly ether+N-methylstearylamine. | −37 | −385 | − |
| 6 | PE | Reaction product of phenylglycidyl ether+1:1 mixture of stearylamine and N-methylstearylamine. | −175 | −260 | − |
| 7 | PE | Reaction product of 1,4-butanediol diglycidyl ether and butylamine. | −405 | −502 | − |
| 8 | PE | Reaction product of 1,6-hexanediol diglycidyl ether and butylamine. | −440 | −510 | − |
| 9 | PE | Reaction product of diethyleneglycol diglycidyl ether and dodecylamine. | −280 | −90 | − |
| 10 | PE | Reaction product of 1,2,7,8-diepoxyoctane and stearylamine. | −390 | −255 | − |
| Control C | PP | None | >3,700 | >3,700 | + |
| Control D | PP | Reaction product of stearylamine and ethylene oxide (1:3). | −1,100 | −1,300 | + |
| 11 | PP | Reaction product of phenylethylene oxide+laurylamine. | −330 | −285 | − |
| 12 | PP | Reaction product of phenylethylene oxide+octylamine. | −215 | −370 | − |
| 13 | PP | Reaction product of p-nonylphenylethylene oxide+N-dibutylamine. | −410 | −175 | − |
| 14 | PP | Reaction product of stearylglycidyl ether+laurylamine. | −85 | −300 | − |
| 15 | PP | Reaction product of nonylphenylglycidyl ether+octylamine. | −407 | −480 | − |
| 16 | PP | Reaction product of hexylglycidyl ether and tallow oil amine. | −333 | −148 | − |
| 17 | PP | Reaction product of laurylglycidyl ether+N-dibutylamine. | −260 | −74 | − |
| 18 | PP | Reaction product of 1,4-butanediol-diglycidyl ether and N-methylstearylamine. | −425 | −535 | − |
| 19 | PP | Reaction product of diethyleneglycol diglycidyl ether and stearylamine. | −195 | −230 | − |
| 20 | PP | Reaction product of 1,2,5,6-diepoxyexane and stearylamine. | −180 | −350 | − |
| Control E | PS | None | −2,700 | −2,550 | + |
| 21 | PS | Reaction product of phenylethylene oxide+stearylamine. | −74 | −326 | ± |
| 22 | PS | Reaction product of phenylethylene oxide+N-methylstearylamine. | −275 | −470 | − |
| 23 | PS | Reaction product of p-methylphenylethylene oxide+laurylamine. | −114 | −280 | − |
| 24 | PS | Reaction product of phenylglycidyl ether+N-methylstearylamine. | −74 | −195 | − |
| 25 | PS | Reaction product of 1,2,5,6-diepoxyhexane and ethylstearylamine. | −375 | −560 | − |
| 26 | PS | Reaction product of triethyleneglycol diglycidyl ether and stearylamine. | −110 | −240 | − |
| Control F | PET | None | −2,100 | | + |
| 27 | PET | Reaction product of alpha-methyl-alpha-phenylethylene oxide+laurylamine. | −390 | | − |
| 28 | PET | Reaction product of decylglycidyl ether+N-ethylstearylamine. | −90 | | − |
| 29 | PET | Reaction product of 1,2,7,8-diepoxyoctane and octylamine. | −215 | | − |

[1] PE=low pressure polyethylene, PP=polypropylene, PS=polystyrene, PET=polyethylene terephthalate.

The above data demonstrate the outstanding behavior of the additives of the present invention as compared with controls processed in the same manner except that in controls A, C, E, and F the polymer contained no additive and in controls B and D the polymer contained as additive 1% by weight of the reaction product of 1 mole of stearylamine with 3 moles of ethylene oxide, a known antistatic agent.

The plates of these examples were also tested for exudation by storing the test plates for 8 days at 100 to 120° C., cooling to −40° C., and then visually observing the surfaces of the plate. No exudation of the additive was observed on the surfaces of the plates of the examples.

What we claim and desire to protect by Letters Patent is:

1. A high molecular weight polymer containing as an antistatic agent therefor from about 0.05 to about 4% by weight of the polymer of the reaction product of an amine of the formula $R_1R_2NH$, where $R_1$ is an aliphatic hydrocarbon radical containing from 4 to 22 carbon atoms and $R_2$ is hydrogen or an aliphatic radical containing from 1 to 12 carbon atoms with an oxirane of the formula (a)
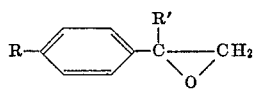

or (b)
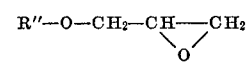

where R is hydrogen or an alkyl group containing from 1 to 12 carbon atoms, R' is hydrogen or methyl, and R'' is an alkyl group containing 1 to 18 carbon atoms or

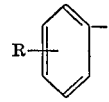

where R is as stated above, said reaction product being prepared by heating said amine and oxirane together at between about 120° and about 240° C. under normal pressure for 1 to 4 hours using an oxirane:amine molar ratio of 2:1 to 1:1 when the amine is a primary amine and 1:1 when the amine is a secondary amine.

2. The composition of claim 1 wherein the polymer is selected from the group consisting of polyethylene, polypropylene, polystyrene, and polyethylene terephthalate.

3. The composition of claim 2 wherein the amine is selected from the group consisting of stearylamine, N-methylstearylamine, laurylamine, octylamine, N-dibutylamine, butylamine, dodecylamine, and N-ethylstearylamine.

4. The composition of claim 3 wherein the oxirane is phenylglycidyl ether.

5. The composition of claim 3 wherein the oxirane is phenylethylene oxide.

6. The composition of claim 3 wherein the oxirane is p-methylphenylethylene oxide.

References Cited

UNITED STATES PATENTS

| | | | |
|---|---|---|---|
| 3,108,011 | 10/1963 | Frotscher | 117—62.2 |
| 3,317,505 | 5/1967 | Braus | 260—94.9 |
| 2,938,004 | 5/1960 | De Hoff et al. | 260—2 |
| 3,161,594 | 12/1964 | White et al. | 252—8.8 |
| 3,294,864 | 12/1966 | Karoly et al. | 260—836 |
| 3,365,435 | 1/1968 | Adams et al. | 260—93.7 |

JOSEPH L. SCHOFER, Primary Examiner

C. A. HENDERSON, Jr., Assistant Examiner

U.S. Cl. X.R.

8—115.5; 117—139.5; 260—2, 47, 83.7, 85.5, 89.1, 93.5, 93.7, 94.9, 836, 837